United States Patent [19]
Yamada

[11] Patent Number: 6,053,268
[45] Date of Patent: Apr. 25, 2000

[54] VEHICLE ENVIRONMENT RECOGNITION SYSTEM

[75] Inventor: Katsunori Yamada, Yokohama, Japan

[73] Assignee: Nissan Motor Co., Ltd., Kanagawa, Japan

[21] Appl. No.: 09/012,578

[22] Filed: Jan. 23, 1998

[30] Foreign Application Priority Data

Jan. 23, 1997 [JP] Japan .................................. 9-009944

[51] Int. Cl.$^7$ ...................................................... B60T 7/16
[52] U.S. Cl. ........................................................... 180/167
[58] Field of Search ................................. 180/161–169; 701/23, 25–28, 117

[56] References Cited

U.S. PATENT DOCUMENTS

| | | | |
|---|---|---|---|
| 4,905,151 | 2/1990 | Weiman | 364/424.02 |
| 5,442,552 | 8/1995 | Slaughter | 364/424.07 |
| 5,675,489 | 10/1997 | Pomerleau | 364/424.027 |

FOREIGN PATENT DOCUMENTS

| | | |
|---|---|---|
| 6-36033 | 2/1994 | Japan . |
| 7-244717 | 9/1995 | Japan . |

*Primary Examiner*—Christopher P. Schwartz
*Assistant Examiner*—C. T. Bartz
*Attorney, Agent, or Firm*—McDermott, Will & Emery

[57] ABSTRACT

A vehicle environment recognition system comprises an input section for forming an input electronic image of a forward road ahead of a vehicle, and an image processing section for detecting another vehicle ahead or a configuration of the forward road from the image. The processing section prepares a set of integrand images from two or more input images, and produces a new integral image by superposing the integrand images. From information supplied from the input section, the processing section detects a lateral position of the vehicle relative to the road, and adjusts the lateral positions of the integrand images in accordance with the detected lateral vehicle position before the integration to produce the integral image. The recognition system can therefore integrate images without undesirable lateral deviation and detects an object region accurately from the integral image.

18 Claims, 15 Drawing Sheets

CENTER OF IMAGE

Ll   Lr

WHITE LINE DETECTION IN NEAR REGION

ROAD REGION BOUNDARY LINES CALCULATED FROM WHITE LINE POSITIONS

DISTANCE l

DETECTED WHITE LINE POSITIONS

WIDTH h

VEHICLE ENVIRONMENT RECOGNITION SYSTEM

BACKGROUND OF THE INVENTION

The present invention relates to an onboard vehicle environment recognition system for recognizing a driving environment of a vehicle by detecting another vehicle ahead and road geometry.

Japanese Patent Provisional (KOKAI) Publications Nos. 6(1994)-36033 and 7(1995)-244717 show conventional vehicle environment recognition systems. A conventional recognition system as disclosed in these documents is designed to perform an integrating operation in the coordinate system of input images. When the vehicle moves laterally along the right and left direction, input images move laterally in accord with the lateral movement of the vehicle. Therefore, the integration of images of a preceding vehicle and a white line painted on a road involves an undesired lateral deviation. This causes errors in the detection of a vehicle position, and a white line position. When the vehicle moves from one lane to another lane, the conventional recognition system may erroneously detect, as a preceding vehicle, another vehicle which is no longer in the same lane.

SUMMARY OF THE INVENTION

It is an object of the present invention to provide a vehicle environment recognition system which can integrate images of a forward object, such as an ahead-going vehicle or a painted line on a road, accurately even when the position of the vehicle is changed along the lateral (left and right) direction.

According to the present invention, a vehicle driving environment recognition system comprises imaging means for forming an input image of a forward road; lateral position detecting means for detecting a lateral position-of a road vehicle on which the recognition system is mounted, relative to a road; image transforming means for transforming the input image into a transformed image by using the lateral position according to an image transform characteristic determined in accordance with a characteristic parameter and a positional parameter of the imaging means; integrating means for producing an integral image by integrating the transformed image; and feature extracting means for extracting a characteristic region from the integral image.

The recognition system thus detects the lateral position of the vehicle relative to the road, then adjusts the lateral positions of images to be integrated, in accordance with detected lateral position of the vehicle, and integrate the images after the adjustment. Therefore, the recognition system can integrate images of a preceding vehicle and a painted line on a road accurately without lateral deviation. The recognition system according to the present invention can reduce the error in computation of the vehicle lateral position and white line position. The recognition system can correctly discern a forward vehicle in case of a change of lanes.

DETAILED DESCRIPTION OF THE INVENTION

Figure 1:
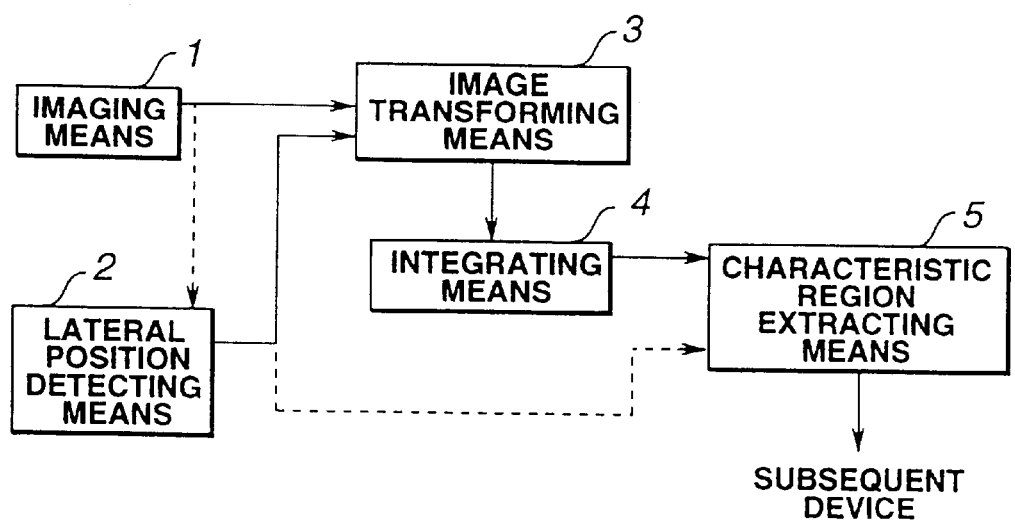
FIG. 1 is a block diagram showing an arrangement of means which can be used in a first embodiment of the present invention.

FIG. 1 shows an arrangement of various means which can be employed in a first embodiment of the present invention. A system shown in FIG. 1 includes an imaging means 1 for forming an image of a forward road ahead of a vehicle; a lateral position detecting means 2 for detecting a lateral position of the vehicle with respect to a lane of the road; an image transforming means 3 for receiving signals from the imaging means 1 and the lateral position detecting means 2, determines an image transformation method in accordance with information on a characteristic parameter and a mounting position of the imaging means 1, and transforming the image by using the lateral position detected by the lateral position detecting means 2; an integrating means 4 for integrating the image transformed by the transforming means 3; and a characteristic region extracting means 5 for extracting a characteristic region from the integral image obtained by the integration of the integrating means 4. An output signal of the extracting means 5 is supplied to a subsequent device such as a vehicle-to-vehicle distance sensing device, and/or a collision preventing device (or a device for crash avoidance).

Figure 2:
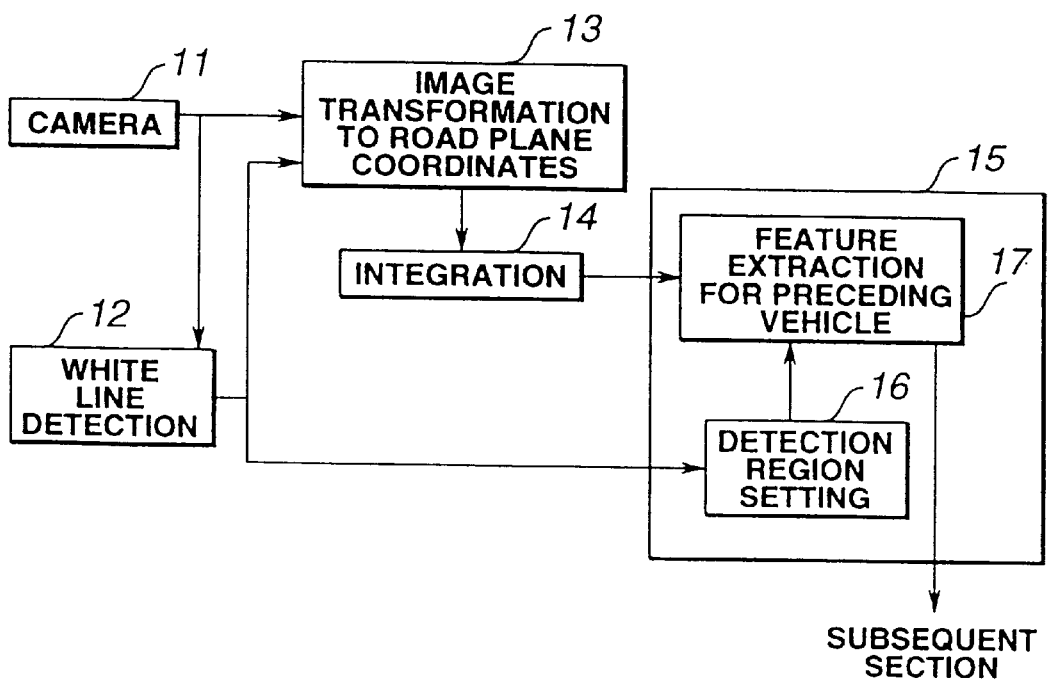
FIG. 2 is a block diagram showing a vehicle environment recognition system according to the first embodiment of the present invention.

FIG. 2 shows a vehicle environment recognition system according to the first embodiment of the present invention. The recognition system is installed in a road vehicle. The recognition system comprises an input section and an image processing section.

The input section comprises a camera 11. The camera 11 forms an image of a forward road ahead of the vehicle, and produces an electric signal representing the image. The cameral 11 corresponds to the imaging means 1.

The image processing section includes a white line detecting subsection 12, a coordinate transforming subsection 13, an integrating subsection 14 and a feature extracting subsection 15.

The white line detecting subsection 12 is for detecting a white line (or lane boundary) demarcating a lane of the road from the input image produced by the camera 11, and producing an output signal indicating a lateral position. The white line detecting subsection 12 corresponds to the lateral position detecting means 2.

The coordinate transforming subsection 13 is designed to produce a modified image in accordance with output signals of the camera 11 and the white line detecting subsection 12 by modifying the input image by a coordinate transformation to a road plane coordinate system with a mounting parameter or cameral orientation parameter (a known quantity) of the camera 11.

The integrating subsection 14 produces an integral image by integration of the modified image.

The feature extracting subsection 15 shown in FIG. 2 comprises a detection region setting subsection 16 and a preceding vehicle's feature extracting subsection 17. The detection region setting subsection 16 sets a detection region in which the system searches for a preceding vehicle, in accordance with the output of the white line detecting subsection 12. The feature extracting subsection 17 receives the output signals of the integrating subsection 14 and the region setting subsection 16, detects horizontal edges representing a preceding vehicle, and determines the position.

With these sections, the recognition system can detects an ahead-going preceding vehicle and determines the position of the preceding vehicle.

In this example, the processing section including the line detecting subsection 12, the transforming subsection 13, the integrating subsection 14 and the extracting subsection 15 is a computer system including at least one onboard computer.

Figure 3:
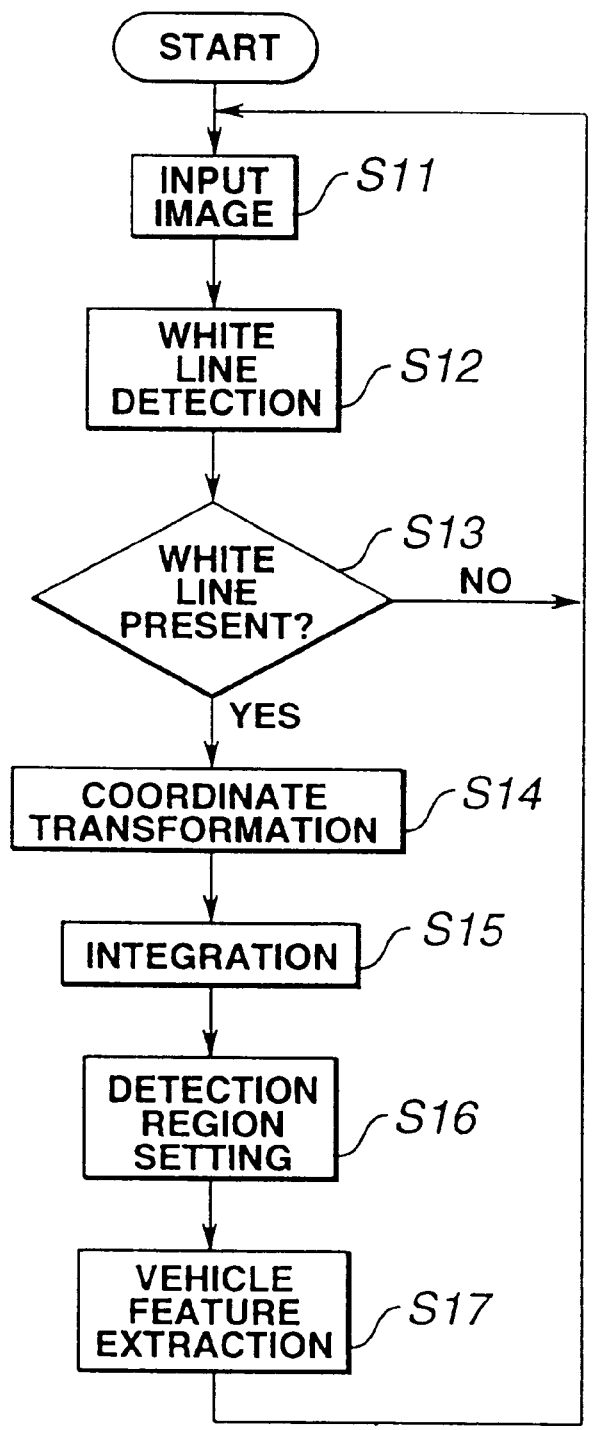
FIG. 3 is a flowchart showing a process performed by the recognition system of FIG. 2.

FIG. 3 shows a vehicle environment recognition process performed by the recognition system of FIG. 2.

At a step S11, the processing section obtains an image of a scene ahead of the road vehicle from the camera 11.

At a step S12, the processing section searches for a road white line within a preset region on the input road image obtained at the step 11. For example, the preset region for the search is a near region close to the vehicle, as shown in FIG. 4.

Figure 4:
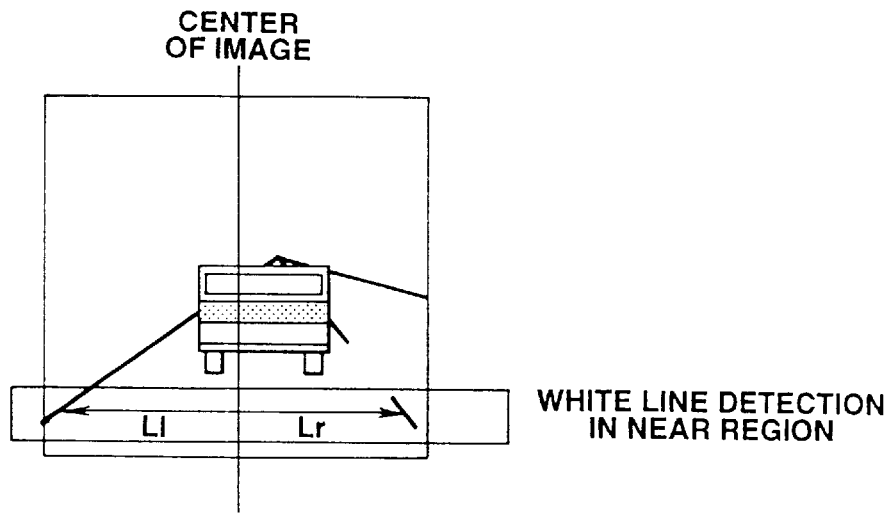
FIG. 4 is a schematic view showing a near region in a forward image formed by the recognition system of FIG. 2.

In FIG. 4, L1 is a distance from a center line of the image to a left side white painted line defining a left side boundary of a lane that the vehicle is following, and Lr is a distance from the image center line to a right side white pained line defining a right side boundary of the lane. In the case of the keep-to-the-left road traffic system, the right side line may be a centerline of the road. From the left and right side white lines, the processing section calculates a current lateral deviation of the vehicle relative to the lane. For example, the position of the left side line is a reference position for calculating the lateral deviation. Then, the processing section determines a number of pixels from the left side white line to the image center line at a predetermined y coordinate position. A length corresponding to one pixel is calculable, and therefore, the recognition system preliminarily sets the length corresponding to one pixel. Thus, the recognition system can calculate the current position (the lateral deviation) of the vehicle from the referenced white line in the road coordinates L (y coordinate). FIGS. 6~12 illustrates the white line detection of this example more in detail.

At a step S13, the processing section determines whether a white line is detected or not (that is, whether the lateral deviation is calculated or not). From the step S13, the processing section proceeds to a step S14 if the answer of the step S13 is YES, and returns to the step Sll in the case of NO.

Figure 5:
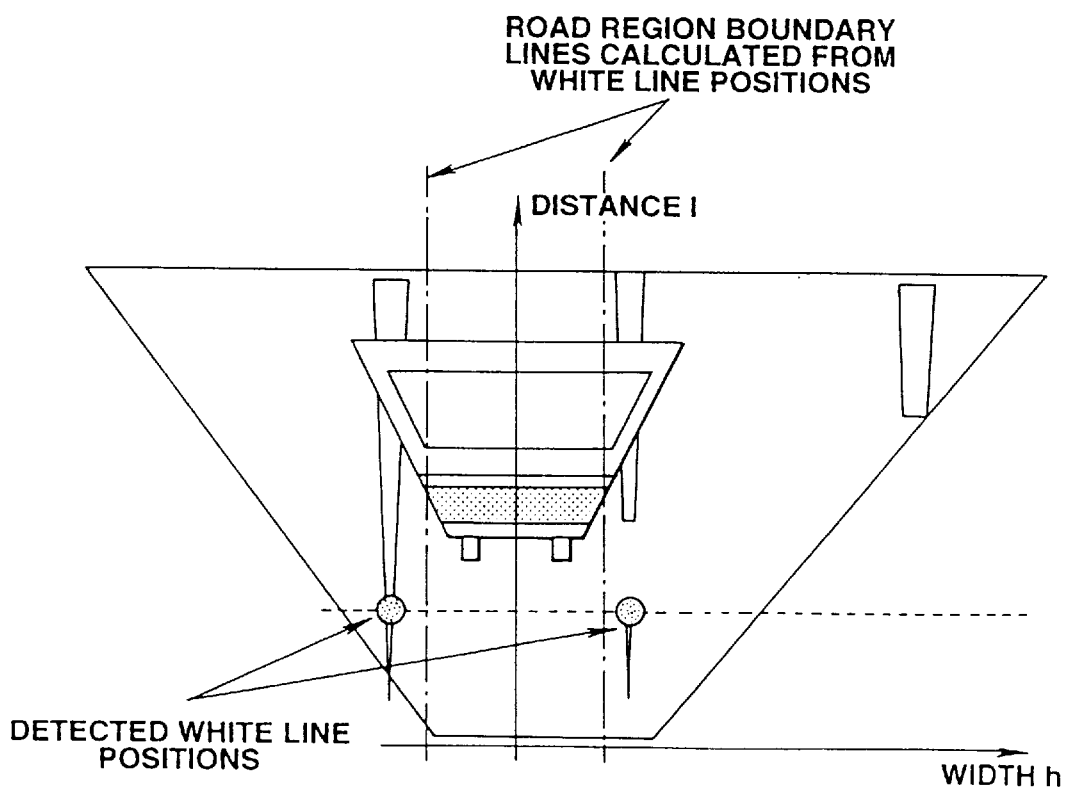
FIG. 5 is a view schematically showing an image transformed into a horizontal plane coordinate system by the recognition system of FIG. 2.
Figure 13:
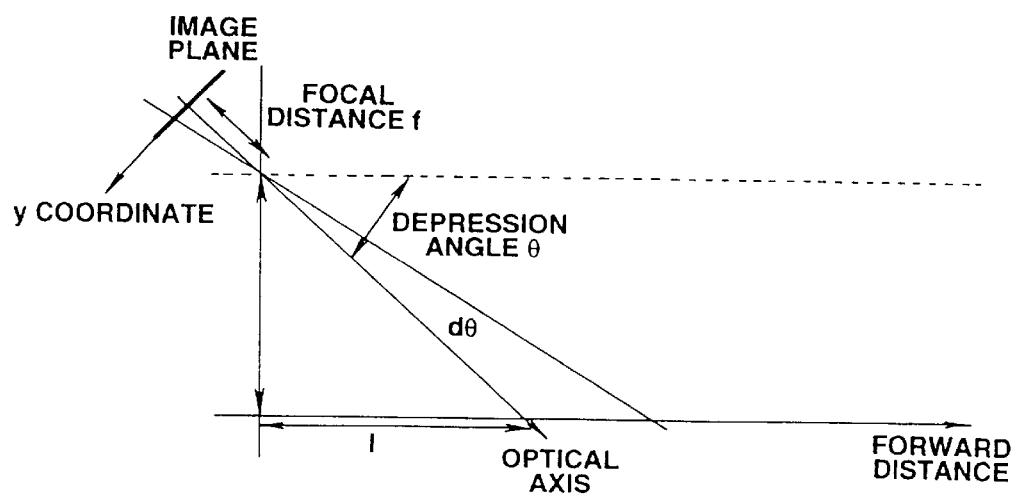
FIG. 13 is a view showing a geometric relationship in a vertical plane between an image plane coordinate system of the camera of FIG. 2 and a horizontal road plane coordinate system employed in the recognition system of FIG. 2.
Figure 14:
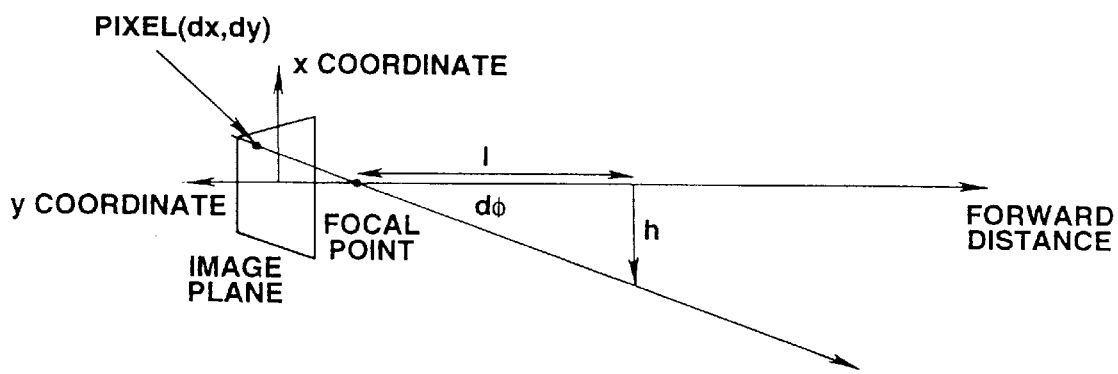
FIG. 14 is a schematic view showing a geometric relationship in a horizontal plane between the image plane coordinate system and the road. plane coordinate system.

At the step S14, the processing section performs a coordinate transformation. In accordance with known data such as the mounting position of the camera and a lens parameter, the processing section transforms the input image to a transformed image of a horizontal plane coordinate system (as shown in FIG. 5, for example) by the coordinate transformation. FIGS. 13 and 14 illustrate the coordinate transformation of this example more in detail.

A step S15 is an integration step. The integration of the step 515 is performed on the transformed image obtained at the step S14 and a previous integral image. By using a first detected in-lane vehicle position as an origin and further using the current vehicle lateral position and, the processing section integrates coordinated transformed images sequentially. The integration is performed from integral image G and input image F according to the following expression.

$$G = G \times (1-\beta) + F \times \beta \qquad (1)$$

In this equation, $\beta$ is a constant ($\beta < 1$). FIGS. 15~18 shows the integration process more in detail.

At a step S16, the processing section sets a detection region. This operation is for delimiting a road region in the integral image by using the white line positions detected at the step 512. As shown in FIG. 5, the processing section sets two parallel boundary lines between which the road region is defined. The boundary lines are vertical straight lines parallel to a distance coordinate axis extending in the x direction. The boundary lines are located between the left and right side white line positions detected at the step 512. The left side boundary line is located between the left side white line position and the middle between the left and right white line positions. The right side boundary line is located between the right side white line position and the middle between the left and right white line positions. The left side distance between the left side boundary line and the left side white line position is set equal to a predetermined distance value. The right side distance between the right side boundary line and the right side white line position is set equal to the predetermined distance value. Both of the left and right side distances are equal to each other. In the example of FIG. 5, the distance axis representing the forward distance is a vertical axis, and a width axis representing a lateral position is a horizontal axis.

At a step S17, the processing section searches for a feature of a vehicle by extracting a characteristic region. In this vehicle detecting process, the processing section uses horizontal edges in the road region bounded between the two parallel boundary lines determined at the step S16. In this example, the processing section first computes horizontal edges in the image region between the boundary lines. Then, the processing section searches for a feature of a vehicle by examining the horizontal edges, in the order of the distance so that a closer edge having a smaller distance is prior to a further edge having a larger distance. If an edge exceeding a predetermined threshold extends continuously beyond a predetermined length along the horizontal direction, then the processing section judges that edge to be an edge of a vehicle region. The processing section examines all the pixels within the road region in this way. After the completion of this examination, the processing section selects the closest vehicle region edge which is one of the horizontal edges judged to be an edge of a vehicle region and which has the smallest distance coordinate so that the corresponding object is closest to the vehicle equipped with this recognition system. The processing section sets an estimated distance to a preceding vehicle equal to the distance coordinate of the closest vehicle region edge.

The recognition system according to this embodiment calculates the lateral position of the vehicle relative to the forward road by processing the input road image, and performs the integration of images after modifying the images with the relative lateral position. Therefore, the recognition system can integrate images without undesired deviation in the lateral direction even when the vehicle moves along the left and right direction.

The recognition system of this example performs the white line detection process of the step S12, the coordinate transformation process of the step S14 and the integration process of the step S15 in the following manner.

White Line Detection

Figure 6:
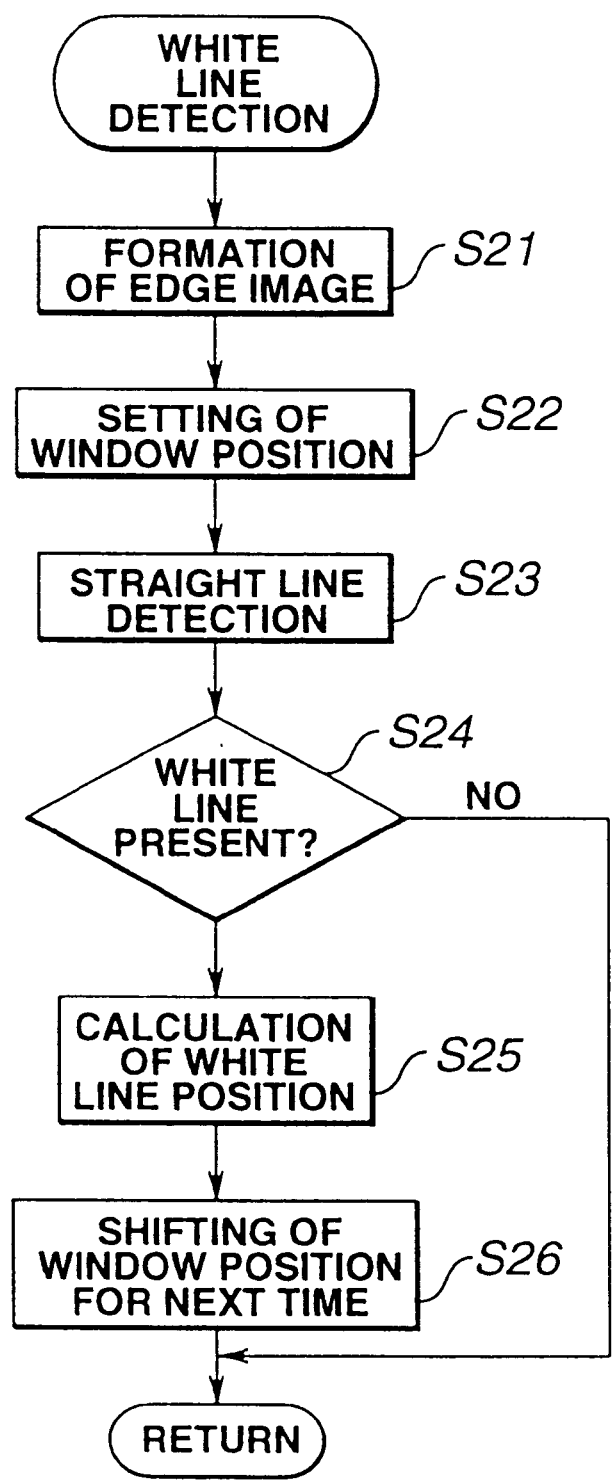
FIG. 6 is a flowchart showing a white line detection of a step S12 of FIG. 3.

FIG. 6 shows the white line detection process.

Figure 9:
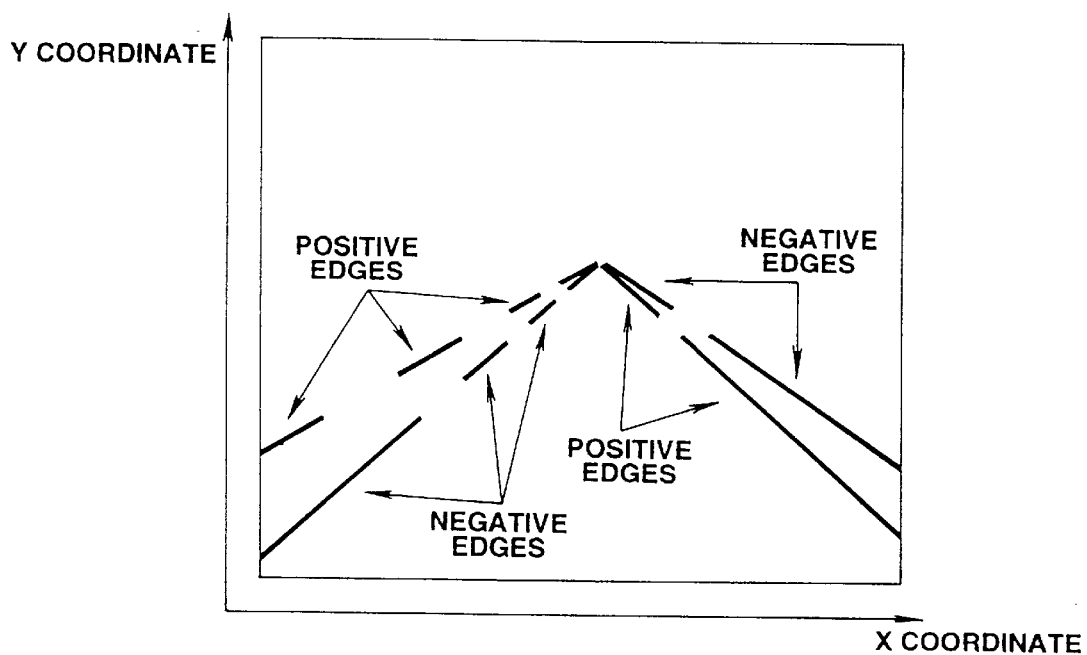
FIG. 9 shows an edge image obtained by the white line detecting process.

At a step S21, the processing section produces an edge image. In this example, the processing section applies a SOBEL operator for extracting vertical edge components, to the whole of the input road image, and by so doing obtains a vertical edge image as shown in FIG. 9. The image shown in FIG. 9 includes positive edges and negative edges. A positive edge is a point of transition from a dark level to a bright level (corresponding to a transition from a road surface to a white line). A negative edge is a point of transition from a bright level to a dark level (from a white line to a road surface). Therefore, a region bounded between a positive edge and an adjacent negative edge is likely to be a region of a white line.

Figure 10:
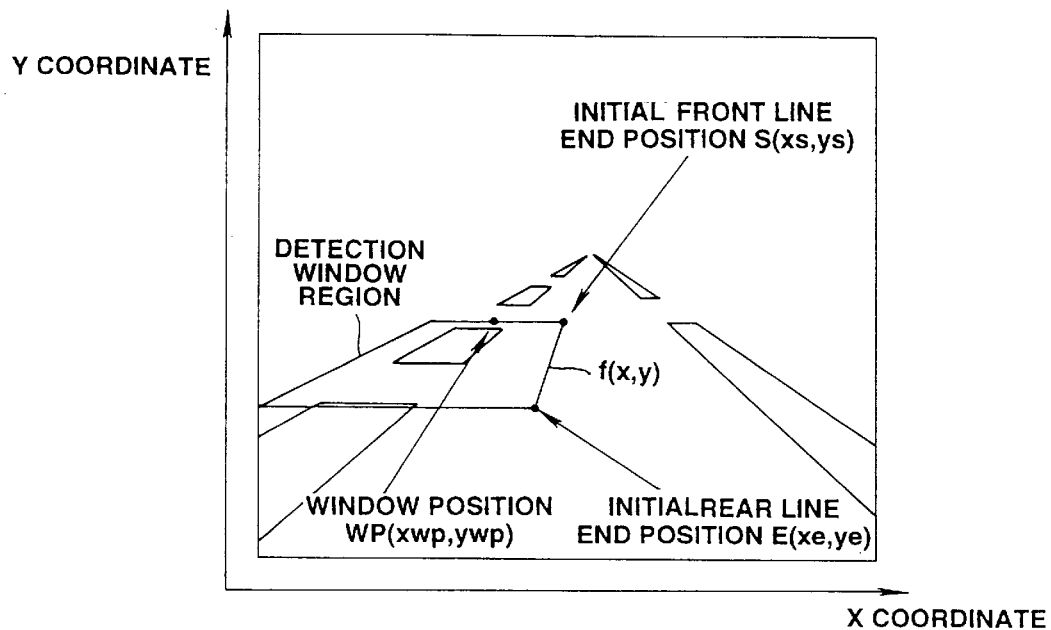
FIG. 10 shows an image for illustrating a step S22 of FIG. 6 for setting a window position.

At a step S22, the processing section sets a window position WP(xwp, ywp) as shown in FIG. 10. The window position is the position of a window in which a search for a road white line is performed. An initial window position W1(x1, y1) is preliminarily determined and stored in a memory section. The initial position W1 is a position near a white line appearing in a road image in the case of a straight ahead driving on a highway. The window position WP (xwp, ywp) is initially set at the initial position W1(x1, y1).

A step S23 is for straight line detection. The processing section detects a straight line by using, as a reference, the window position set at the step S22.

Figure 7:
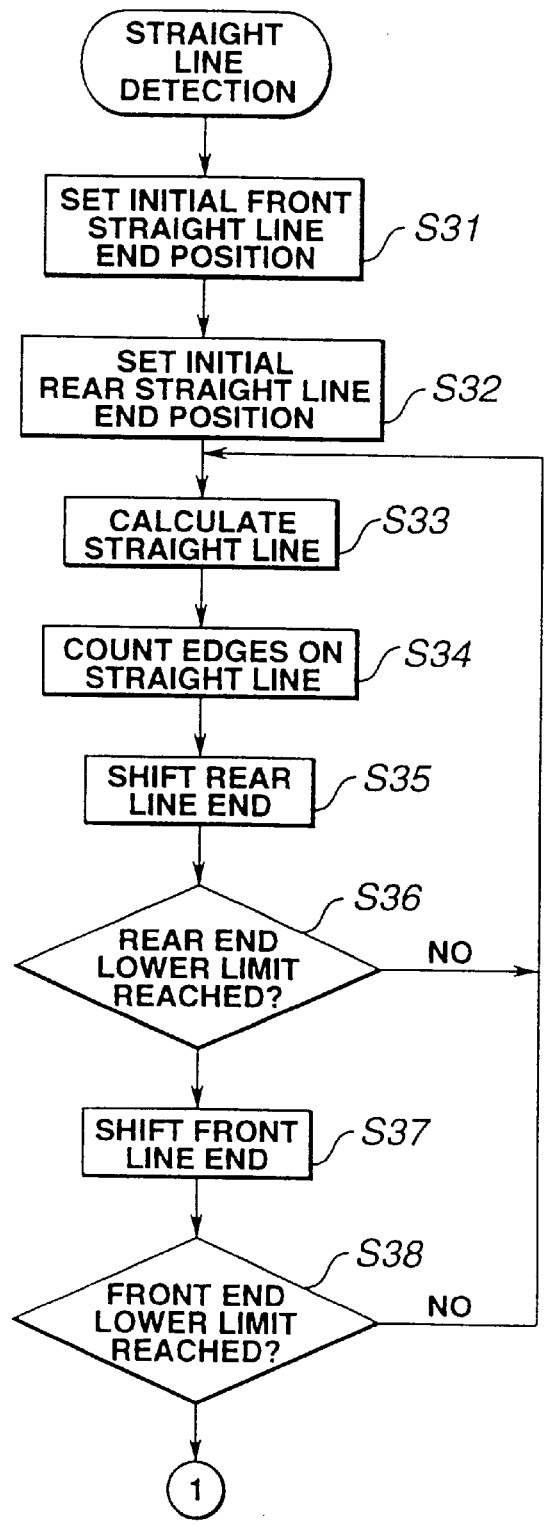
FIGS. 7 and 8 are flowcharts showing a straight line detecting process of a step S23 of FIG. 6.
Figure 8:
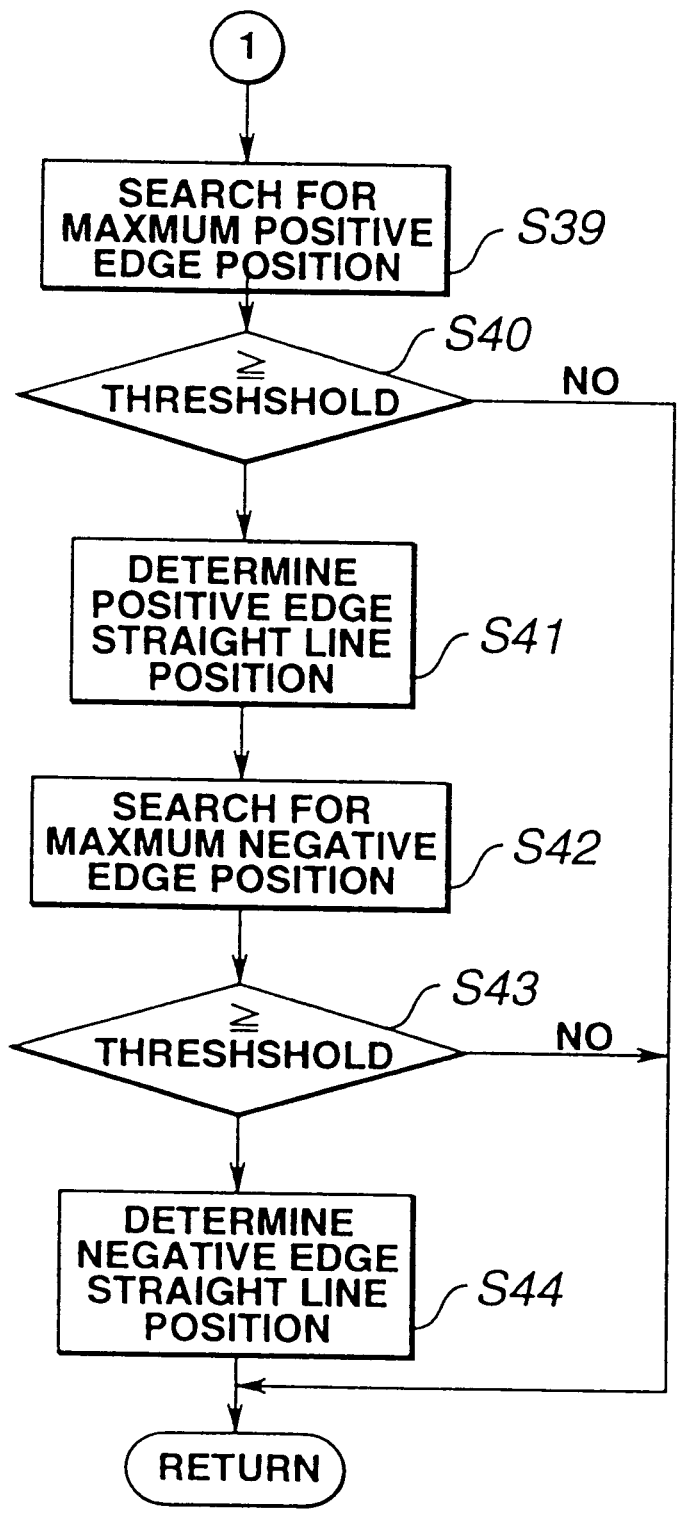

FIGS. 7 and 8 show a straight line detection process. Flowcharts of FIGS. 7 and 8 are connected at a connecting point (①).

At a step S31 of FIG. 7, the processing section sets an initial position of a front end of a straight line. In this operation, the processing section calculates the front line end position from the window position WP and a predetermined width WL of the search region shown in FIG. 11. The initial front line end position S(xs, ys) shown in FIG. 10 is;

xs=xwp+(WL/2)

ys=ywp

Figure 11:
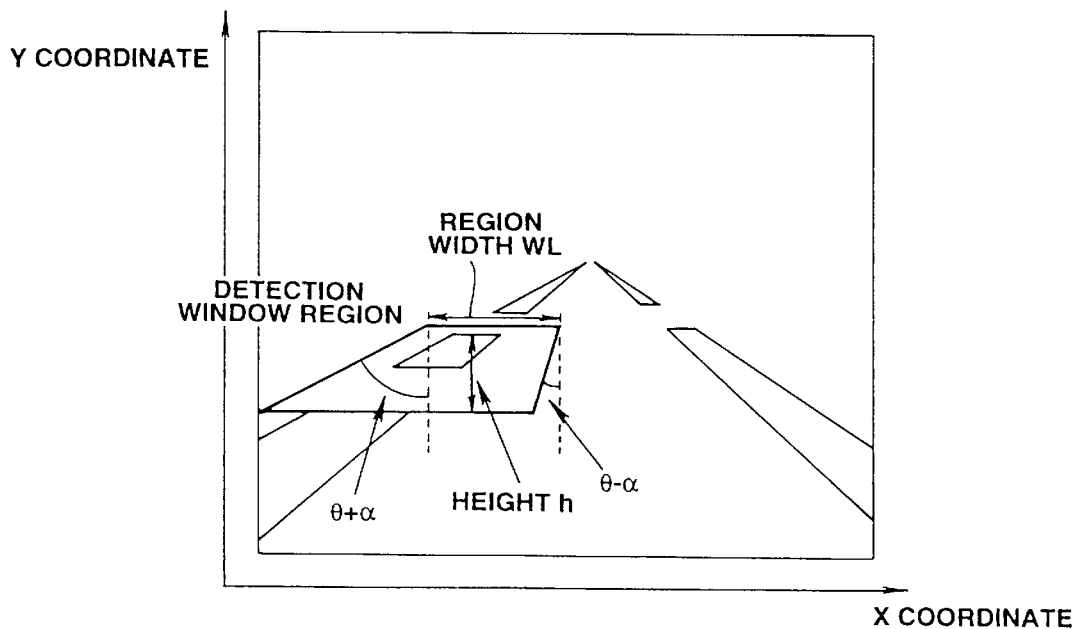
FIG. 11 shows an image for illustrating a step S32 of FIG. 7 for setting an initial rear line end position.

A next step S32 is for setting an initial position of a rear end of a straight line. In this operation, an inclination of a white line to be detected is preliminarily set in accordance with the mounting conditions of the camera system. Assuming the white line inclination is within $\theta \pm \alpha$ a as shown in FIG. 11, and using a window height h, the initial rear line end position E(xe, ye) is given by;

xe=xs−h×tan(θ−α)

ye=ys−h

At a step S33, the processing section performs straight line calculation. In this operation, the processing section determines a straight line f(x, y) passing through the point S(xs, ys) and the point E(xe, ye). The straight line f(x, y) is expressed by;

$$y - ye = \frac{(ys - ye)}{(xs - xe)} \times (x - xe) \qquad (2)$$

At a step S34, the processing section determines the number of edges on the straight line. In this operation, the processing section counts edge points lying on the straight line f(x, y) in the edge image, and determines the number of positive edges on the line and the number of negative edges on the line. The numbers of positive and negative edges and the front and rear end positions xs and xe are stored in the memory section.

At a step S35, the processing section shifts the rear line end by varying the x coordinate of the rear straight line end. In this example, the processing section shifts the rear line end to the left along the x axis by decreasing xe by one, that is xe=xe−1.

At a step S36, the processing section determines whether the rear line end is shifted to a lower limit (in the x coordinate). The processing section returns to the step S33 when the answer of the step S36 is NO, that is;

xe ≧xs−h×tan(θ+α)

The processing section proceeds to a step S37 when the answer of the step S36 is YES, that is;

xe<xs−h×tan(θ+α)

At the step S37, the processing section shifts the front straight line end by varying the x coordinate of the front straight line end. In this example, the processing section shifts the front line end to the left along the x axis by decreasing xs by one, that is xs=xs−1.

At a step S38, the processing section determines whether the front line end is shifted to a lower limit (in the x coordinate). The processing section returns to the step 533 when the answer of the step 538 is NO, that is;

xs≧xwp−(WL/2)

The processing section proceeds to a step S39 of FIG. 8 when the answer of the step S38 is YES, that is;

xs<xwp−(WL/2)

In this way, the processing section examines edge points on a straight line by shifting the front line end and varying the inclination of the straight line from (θ−α) to (θ+α) at each front line end point.

At the step S39 of FIG. 8, the processing section retrieves a maximum positive edge position which is the front line end position of the line having the greatest number of positive edges among the lines stored in the memory section.

At a step 540, the processing section determines whether the positive edge number found by the retrieval is equal to or greater than a predetermined threshold value. When the edge number is equal to or greater than the threshold value (the answer is YES), the processing section judges a straight line to be present and proceeds to a step S41. When the edge number is smaller than the threshold value (the answer is NO), the processing section terminates the straight line detecting process.

At the step S41, the processing section determines a positive edge straight line position by substituting the x coordinates of the front and rear line ends of the detected straight line into a front end position xps and a rear end position xpe of a positive white line.

At the step S42, the processing section retrieves a maximum negative edge position which is the front line end position of the line having the greatest number of negative edges among the lines stored in the memory section.

At a next step S43, the processing section determines whether the negative edge number found by the retrieval is equal to or greater than a predetermined threshold value. When the edge number is equal to or greater than the threshold value (the answer is YES), the processing section judges a white line to be present and proceeds to a step S44. When the edge number is smaller than the threshold value (the answer is NO), the processing section terminates the straight line detecting process.

At the step S44, the processing section determines a negative edge straight line position by substituting the x coordinates of the front and rear line ends of the detected straight line into a front end position xns and a rear end position xne of a negative white line.

In this way, the processing section determines whether a straight line exists in the detection region. If there exists, the processing section determines the straight line position in the image.

Then, the processing section returns to the white line detection flow of FIG. 6, and proceeds to a step S24.

At the step S24, the processing section determines whether a white line exists. In this operation, the processing section calculates the positive white line position and the negative white line position, and judges a white line to be present if the difference between the negative white line front end position xns and the positive white line rear end position xpe is equal to or smaller than a predetermined threshold value. This difference between xns and xpe is determined by the slope and thickness of a white line. A white line is considered to be present if the slope or the thickness is equal to or smaller than a setting. The processing section proceeds to a step S25 in the case of existence of a white line (YES), and terminates the white line detecting process in the case of nonexistence of a white line (NO).

Figure 12:
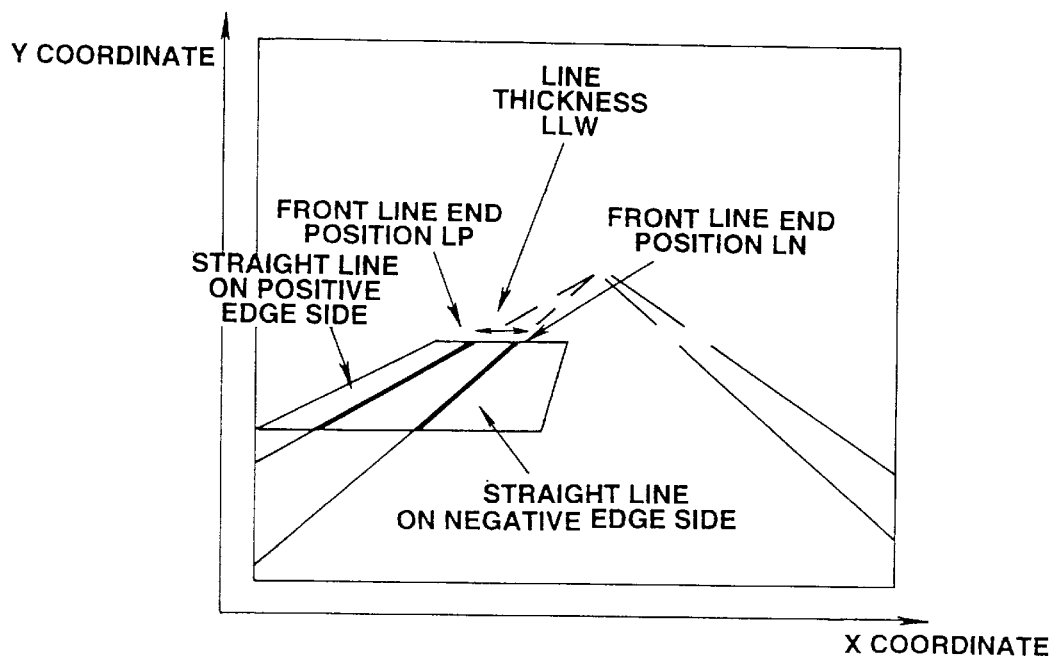
FIG. 12 shows an image for illustrating a white line position detection performed by the recognition system of FIG. 2.

At the step S25, the processing section performs a white line position calculation. In this operation, the processing section calculates a white line position from the detected positive white line position LP (xps, ys) and negative white line position LN (xns, ys) (cf. FIG. 12). A line thickness LLW shown in FIG. 12 is equal to (xps−xns).

At a step S26, the processing section shift the position of the window. In this example, the processing section shifts the window by substituting (xps+xns)/2 into the x coordinate xwp of the position WP(xwp, ywp) of the window for the white line detection. By this window shifting, the recognition system can provide a good detecting performance even if the position of the white line moves.

In this way, the processing section completes the white line detecting process.

Coordinate Transformation

FIGS. 13 and 14 are views for illustrating a coordinate transformation process of the step S14 of FIG. 3. FIG. 13 shows a vertical plane, and FIG. 14 a horizontal plane. In the example of FIGS. 13 and 14, the parameters of the camera 11 are as follows: The focal length is f, the number of pixels in the x direction is IX, the number of pixels in the y direction is IY, the image size along the y direction is CCDH (m) and the image size along the x direction is CCDW (m). The mounting parameters of the camera 11 are; camera height H and depression angle θ.

In FIG. 13, a pixel at dy from the center defines an angle dθ with the optical axis. This angle dθ is a parameter representing the position of the pixel location at dy from the center, in the real space (in the vertical plane). The angle dθ and the forward distance I corresponding to the pixel location dy are given, respectively, by the following equations (3) and (4).

$$d\theta = \operatorname{atan}\left(\frac{CCDH}{IY} \times \frac{dy}{f}\right) \quad (3)$$

$$l = \frac{H}{\tan(\theta - d\theta)} \quad (4)$$

In FIG. 14, an angle dφ defined by a pixel location (dx, dy) is a parameter representing the position of the pixel location (dx, dy) in the real space (in the horizontal plane). The angle dφ and a lateral width (or distance) h corresponding to the pixel location (dx, dy) are given, respectively, by the following equations (5) and (6).

$$d\phi = \operatorname{atan}\left(\frac{CCDW}{IX} \times \frac{dx}{F}\right) \quad (5)$$

In the equation (5), $$F = \sqrt{[(CCDH/IY) \times dy]^2 + f^2} \quad (6)$$

$$h = \sqrt{(H^2 + I^2)} \times \tan(d\phi)$$

By using these equations, the processing section performs the coordinate transformation.

Integration

Figure 15:
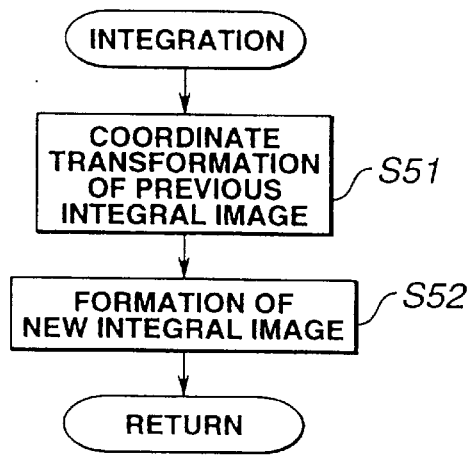
FIG. 15 is a flowchart showing a step S15 of FIG. 3 for integration.

FIG. 15 shows the integration process of the step S15 shown in FIG. 3.

At a step S51, the processing section performs a coordinate transform operation (or an image translating operation) on a previous integral image. In this example, the processing section computes an amount of lateral movement of the vehicle from a difference between the previous lateral deviation and the current lateral deviation, and translates the previous integral image laterally in the direction opposite to the direction of the lateral movement of the vehicle so that the amount of lateral image translation is equal to the amount of the lateral movement of the vehicle.

Figure 16:
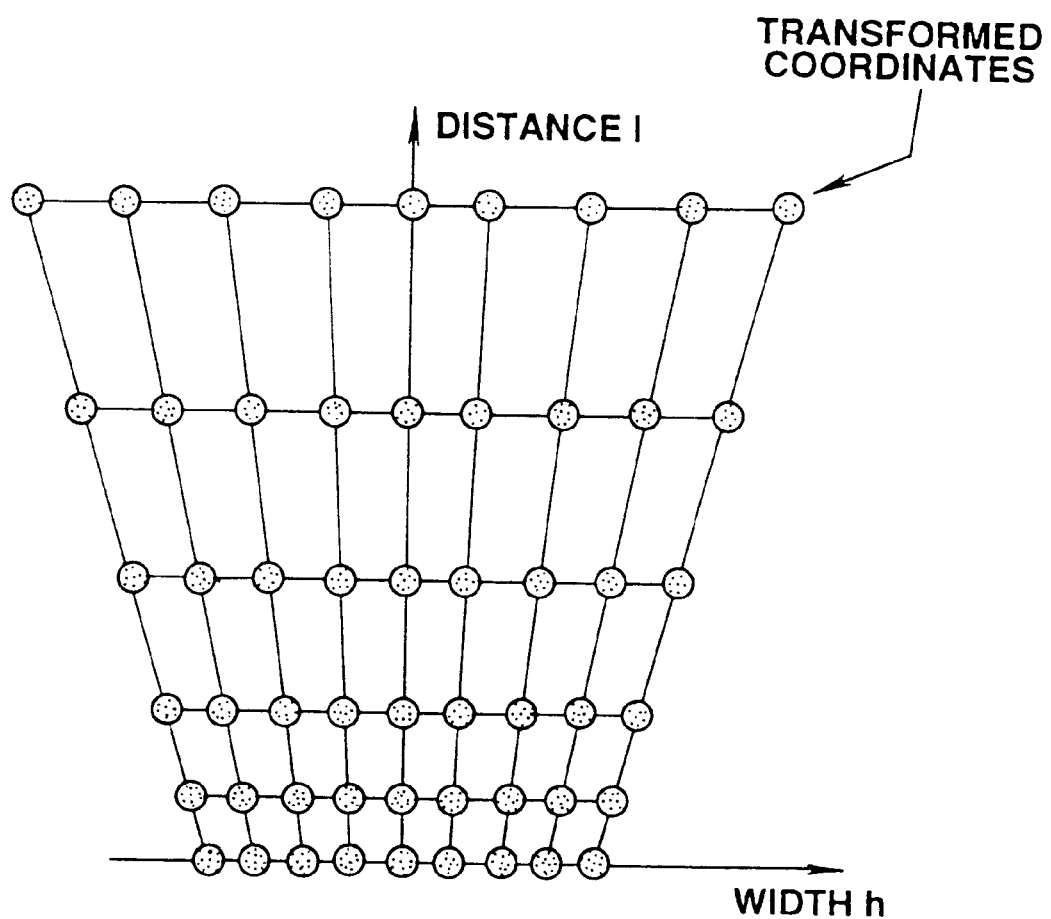
FIG. 16 is a view schematically showing an image obtained by a coordinate transformation of a step S14 of FIG. 3.
Figure 17:
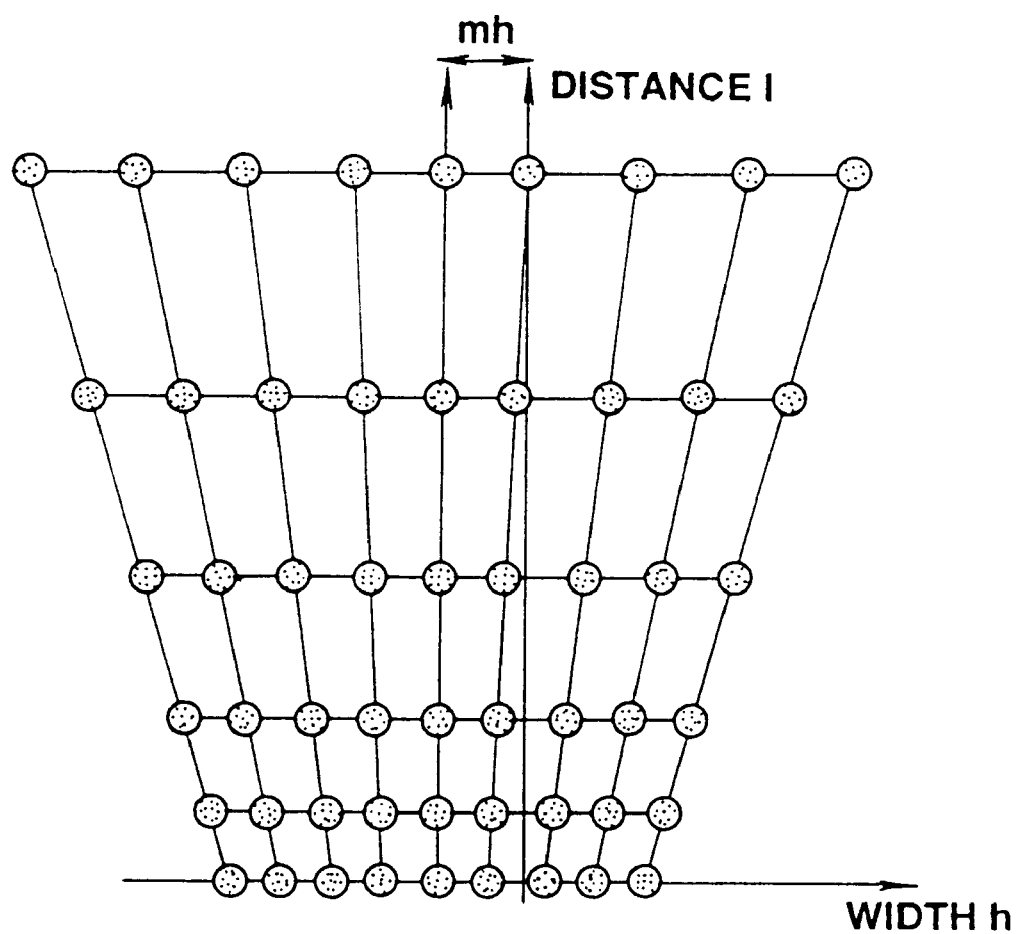
FIG. 17 is a view schematically showing an image obtained by a lateral translation of the recognition system of FIG. 2.

FIG. 16 shows, as an example, a transformed image obtained by the coordinate transformation of the step S14. The plane coordinate system shown in FIG. 16 has a horizontal axis representing the width (or lateral distance) h, and a vertical axis representing the forward distance I. Each pixel location is converted to a lattice point as shown in FIG. 16. FIG. 17 shows an image obtained from the image of FIG. 16 by the lateral image translation operation. The direction of the image translation is opposite to the direction of the lateral movement of the vehicle, and parallel to the horizontal axis of the width h. The displacement (or linear distance) mh between the images of FIGS. 16 and 17 is equal to the amount of the lateral movement of the vehicle in the image calculated from the difference between the current lateral deviation (or lateral position) and the previous lateral deviation (or lateral position) of the vehicle.

Figure 18:
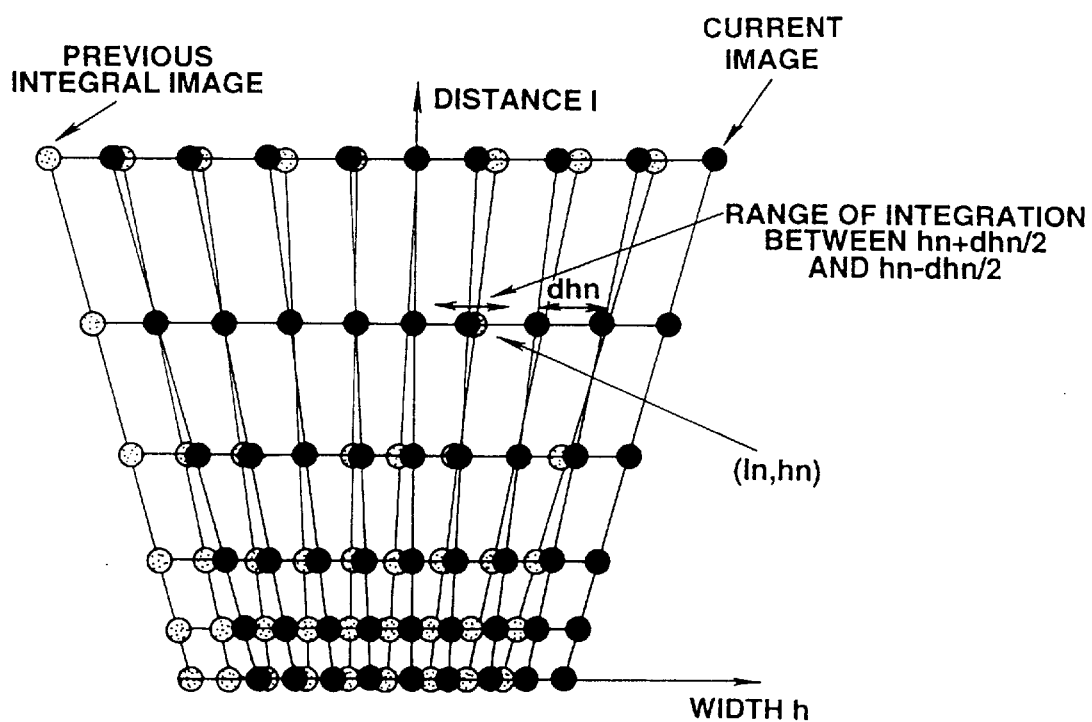
FIG. 18 is a view schematically showing a new integral image formed by superposition of a current transformed image and a previous integral image in the recognition system of FIG. 2.

At a step S52, the processing section forms a new integral image. In this example, the current transformed image is superposed on the previous (most recent) integral image, as shown in FIG. 18. As to each distance I, image data is stored in the form of data sorted in the order of the width. In FIG. 18, the horizontal axis represents the width h, the vertical axis represents the forward distance I, and the coordinate location of a given data item is (In, hn). Then, the processing section integrates the current image and the previous image. In this example, the processing section sets the gray level of the new integral image, equal to the average value of data within a predetermined range of the width at each distance. The range of the width is defined between upper and lower limits. At a width of hn, the upper limit is hn+(dhn/2), and the lower limit is hn−(dhn/2). The quantity dhn is a width (or interval) between two adjacent pixels at a distance of In.

Thus, the integration is performed by repeating the above-mentioned operation from the nearest point to the farthest point along the distance axis, and from the smallest value to the greatest value of the width.

Figure 19:
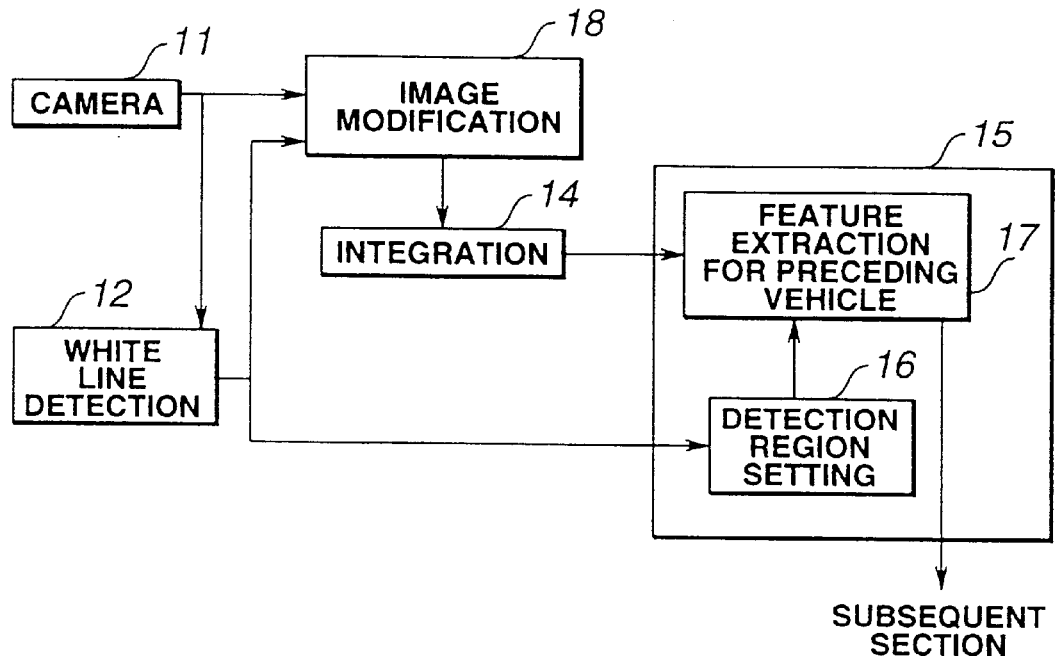
FIG. 19 is a block diagram showing a second practical example according to the first embodiment of the invention.

FIG. 19 shows a second example according to the first embodiment. The recognition system shown in FIG. 19 is different from the recognition system of FIG. 2 in that the coordinate transforming subsection 13 of FIG. 2 is replaced by an image modifying subsection 18 for computing a lateral displacement for each pixel and performs a lateral displacement operation on the image plane coordinate system. The steps 14 and 15 are changed in the following manner.

In this example, the step S14 is a step for determining a lateral resolution ddy at each pixel location. The processing section determines the lateral resolution for each pixel in the image from a difference between a value of the width h obtained by calculation of the equations of transformation of FIGS. 13 and 14 at the pixel location dx, and a value of the width h obtained by calculation of the equations of transformation of FIGS. 13 and 14 at the pixel location dx+1. The lateral resolution ddy remains unchanged as long as dy is unchanged. Therefore, a single value of ddy is calculated for each dy level. The lateral resolution is a quantity indicative of a displacement in the real space corresponding to a one pixel displacement in the image plane.

At the step S15 of this example, the processing section determines a number of pixels dp for lateral displacement at each dy in accordance with the amount of lateral movement dL in the real space. The pixel number dp is given by;

$$dp = dL/ddy$$

It is preferable that the number of pixels dp is an integer. In this example, the number dp is simplified to the nearest integer by curtailing decimal places by rounding off.

Then, at each dy, the processing section transforms the previous integral image by shifting the image by the amount of the number of pixels dp. Then, the processing section integrates the newly transformed integral image on the coordinate system of the input image. In this way, the processing section produces an integral image. Thereafter, the recognition system performs the operations in the same manner as the system of FIG. 2.

Thus, the recognition system can perform integration with no lateral deviation of a preceding vehicle and a white line, even if the vehicle moves left or right.

Figure 20:
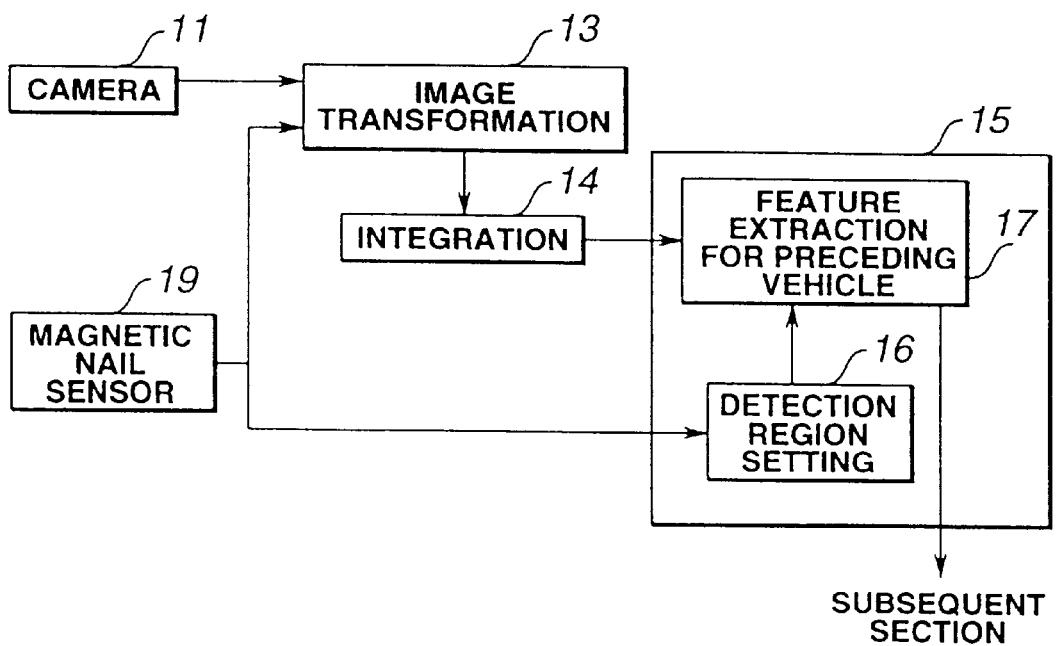
FIG. 20 is a block diagram showing a third practical example according to the first embodiment of the invention.

FIG. 20 shows another example of the first embodiment. A recognition system shown in FIG. 20 includes a magnetic nail sensor 19 instead of the white line detecting subsection 12 of FIG. 2. In the other respects, the system of FIG. 20 is substantially identical to the system of FIG. 2. The magnetic nail sensor 19 is a device for sensing a magnetism of magnetic nails and determining a position on the road. The magnetic nails are fixed to the road surface or buried underground.

In this example, the step S12 is changed. At the step S12 of this example, the processing section determines the position of a nearby magnetic nail with the magnetic nail sensor 19. The magnetic nail sensor 19 produces a voltage signal representing the lateral position of the magnetic nail. The recognition system can calculate the lateral deviation (L1 shown in FIG. 4) by converting the voltage value with a predetermined table. The subsequent operations are substantially identical to the corresponding operations of the example of FIG. 2.

Thus, the recognition system can perform the integration with no lateral deviation of a preceding vehicle and a white line, even if the vehicle moves left or right.

Instead of the magnetic nail sensor, it is possible to employ a device for sensing a signal from a vehicle guide member installed in the road. For example, a conductor line is buried in a road along a lane, and an in-vehicle device transmits radio waves and receive a reflection from the conductor line to detect the vehicle lateral position relative to the lane.

Figure 21:
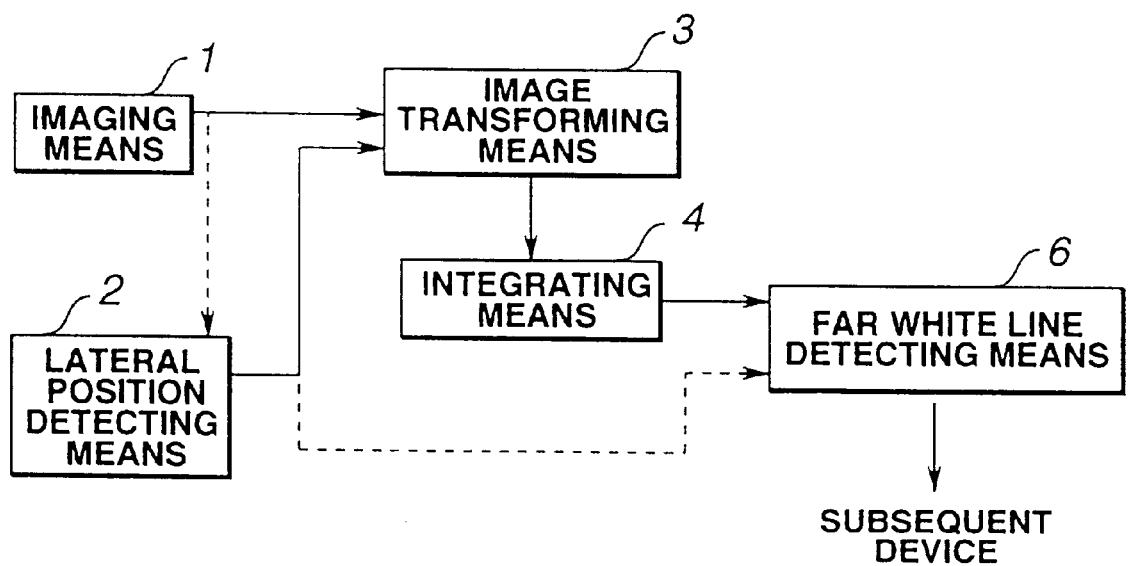
FIG. 21 is a block diagram showing a second embodiment of the present invention.

FIG. 21 shows a vehicle environment recognition system according to a second embodiment of the present invention. The recognition system of FIG. 21 is different from the system of FIG. 1 in that the characteristic region extracting means 5 is replaced by a far white line detecting means 6. In the second embodiment, the steps S16 and S17 are replaced by a far white line detecting step similar to the step S12. On the result of the integration process of the step S15, the processing section performs a white line detecting process similar to the step S12 with a detection region ranging to a remote region (that is an upper region in the image) to detect the shape of the forward road. The processing section performs a subsequent operation substantially in the same manner as in the case of FIG. 2.

The recognition system performs the integration process after an image modification for compensation for a lateral vehicle movement, and then performs a white line detection on the integral image obtained by the integration. Thus, the recognition system can detect the road configuration accurately from the integral image.

According to the illustrated embodiments of the present invention, a vehicle environment recognition system comprises an input section and a processing section. The system may further comprise an output section for controlling or guiding the vehicle or providing information to the driver or to a vehicle control or navigation system.

The input section is a section for collecting information on a driving environment of the road vehicle. The input section forms an input image of a forward scene ahead of the vehicle and supplying data to determine a lateral position of the vehicle relative to a road and data to recognize the environment. The input section may comprise a CCD camera for producing a sequence of images of a forward road. The processing section produces a modified image by modifying the input image in accordance with the lateral position of the vehicle, further produces an integral image from the modified image, and extracts an image feature from the integral image. The processing section prepares a time series of integrand images from a time series of input images supplied from the input section, to geometrically modify the integrand images in accordance with the lateral position of the vehicle to adjust the lateral positions of the integrand images, and then produces an integral image by integration of the integrand images.

The processing section in one example detects the lateral position of the vehicle relative to the road by detecting left and right boundary lines between which a white line is bounded, and detecting the position of a middle between a first intersection between the left boundary line and a predetermined horizontal line of a predetermined y coordinate in the road image and a second intersection between the right boundary line and the predetermined horizontal line.

The integrand images may be images in the road plane coordinate system or in the image plane coordinate system.

What is claimed is:

1. A vehicle driving environment recognition system comprising:
    imaging means for periodically forming an input image of a forward road ahead of a road vehicle;
    lateral position detecting means for detecting a lateral position of the vehicle relative to a road in accordance with the input image;
    image integrating means for transforming the input image into a transformed image in a road plane coordinate system by using the lateral position;
    and for producing an integral image by integrating the transformed image; and
    feature extracting means for extracting a characteristic region from the integral image.

2. The recognition system as claimed in claim 1 wherein the transforming means includes means for determining equations of transformation for transforming the input image to the road plane coordinate system in accordance with parameters of the imaging means, and for transforming the input image into the transformed image in the road plane coordinate system by using the lateral position and the equations.

3. The recognition system as claimed in claim 1 wherein the image integrating means includes means for calculating a lateral resolution at each pixel location in accordance with the parameters of the imaging means and for transforming the input image into the transformed image by shifting each pixel location by an amount determined in accordance with the lateral resolution and a lateral displacement of the vehicle determined from the lateral position detected by the lateral position detecting means.

4. The recognition system as claimed in claim 1 wherein the lateral position detecting means comprises white line detecting means for detecting a road white line from the input image and for calculating the lateral position of the vehicle relative to the road from a position of the white line.

5. The recognition system as claimed in claim 1 wherein the lateral position detecting means comprises means for detecting vehicle guide means provided in a road, and calculating the lateral position of the vehicle relative to the road from a position of the vehicle guide means.

6. The recognition system as claimed in claim 1 wherein the feature extracting means includes a means for detecting a position of a preceding vehicle from the integral image.

7. A vehicle driving environment recognition system comprising:
    imaging means for forming an input image of a forward road ahead of a road vehicle;
    lateral position detecting means for detecting a lateral position of the vehicle relative to a road;
    image transforming means for determining an image transforming method in accordance with a characteristic parameter and a positional parameter of the imaging means and transforming the input image into a transformed image by using the lateral position;
    integrating means for producing an integral image by integrating the transformed image; and
    feature extracting means for extracting a characteristic region from the integral image and for detecting a shape of the forward road from the integral image.

8. A vehicle environment recognition system comprising:
    an input section for collecting information on a driving environment of a road vehicle, the input section forming an input image of a forward scene ahead of the vehicle and supplying data to determine a lateral position of the vehicle relative to a road and data to recognize the environment; and
    a processing section for producing a modified image by modifying the input image by a coordinate transformation from an image plane coordinate system to a road plane coordinate system in accordance with the lateral position of the vehicle, further producing an integral image by using the modified image, and for extracting an image feature from the integral image.

9. The recognition system as claimed in claim 8 wherein the input section comprises a camera for producing a time series of input images of a scene ahead of the vehicle, the processing section is configured to produce a time series of integral images in response to the time series of input images supplied from the camera, the processing section is configured to produce a new integral image from a current image prepared from a most recent input image supplied from the camera and a modified previous image which is an image transformed from a most recent integral image in accordance with the lateral position.

10. The recognition system as claimed in claim 9 wherein the processing section is configured to determine a lateral vehicle displacement from a change in the lateral position, and to produce the modified previous image by displacing each pixel location along a horizontal axis of a coordinate system of the most recent integral image by an amount of lateral image displacement determined in accordance with the lateral vehicle displacement.

11. A recognition system comprising:
    an input section for collecting information on a driving environment of a road vehicle, the input section forming an input image of a forward scene ahead of the vehicle and supplying data to determine a lateral position of the vehicle relative to a road and data to recognize the environment; and
    a processing section for producing a modified image by modifying the input image in accordance with the lateral position of the vehicle, further producing an integral image by using the modified image, and for extracting an image feature from the integral image, wherein
    the input section comprises a camera for producing a time series of input images of a scene ahead of the vehicle, and
    the processing section is configured to
        produce a time series of integral images in response to the time series of input images supplied from the camera,
        produce a new integral image from a current image prepared from a most recent input image supplied from a camera and a modified previous image which is an image transformed from a most recent integral image in accordance with the lateral position, determine a lateral vehicle displacement from a change in the lateral position, produce the modified previous image by displacing each pixel location along to horizontal axis of a coordinate system of the most recent integral image by an amount of lateral image displacement determined in accordance with the lateral vehicle displacement, and produce the new integral image by determining a weighted average of image values of the current image and the modified previous image in each elemental image region.

12. The recognition system as claimed in claim 11 wherein the processing section is configured to produce a transformed image from each input image by a coordinate transformation from an image plane coordinate system to a road plane coordinate system determined by camera parameters, to prepare the modified previous image by translating the most recent integral image along a horizontal axis of the road coordinate system in a direction opposite to a direction of the lateral vehicle displacement by the amount of the lateral image displacement, and to produce the new integral image by superposing the modified previous image on the current image which is a most recent transformed image.

13. The recognition system as claimed in claim 12 wherein the processing section is configured to produce a transformed image from each input image according to equations of coordinate transformation determined in accordance with the camera parameters which comprise a height of the camera, a depression angle of the camera and a focal length of the camera.

14. The recognition system as claimed in claim 11 wherein the processing section is configured to shift each pixel location in the most recent integral image by the amount of the lateral image displacement determined in accordance with the lateral vehicle displacement and a lateral resolution, the lateral resolution being determined for each pixel location in accordance with camera parameters which comprise a height of the camera, a depression angle of the camera and a focal length of the camera.

15. The recognition system as claimed in claim 10 wherein the processing section is configured to detect a road lane boundary in each input image and to determine the lateral position of the vehicle relative to the road from a position of the road lane boundary in each input image.

16. The recognition system as claimed in claim 10 wherein the input section further comprises a device for sensing a signal from a road, and the processing section is configured to determined the lateral position of the vehicle relative to the road in accordance with the signal.

17. The recognition system as claimed in claim 10 wherein the processing section is configured to detect one of a position of a preceding vehicle ahead of the road vehicle in which the recognition system is installed, and a configuration of a forward road.

18. The recognition system as claimed in claim 1 wherein the image integrating means includes means for integrating the transformed image by shifting one of a current transformed image and a previous transformed image in accordance with a different between the lateral position in the previous transformed image and the lateral position in the current transformed image.

* * * * *